US010541928B2

(12) United States Patent
Shih et al.

(10) Patent No.: US 10,541,928 B2
(45) Date of Patent: Jan. 21, 2020

(54) POLICY AWARE FRAMEWORK FOR APPLICATION INPUT OUTPUT MANAGEMENT

(71) Applicant: VMWARE, INC., Palo Alto, CA (US)

(72) Inventors: Chiao-Chuan Shih, Palo Alto, CA (US); Samdeep Nayak, Bangalore (IN); Atanu Panda, Palo Alto, CA (US); Joy Ghosh, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/911,192

(22) Filed: Mar. 5, 2018

(65) Prior Publication Data
US 2019/0222522 A1 Jul. 18, 2019

(30) Foreign Application Priority Data

Jan. 18, 2018 (IN) .............................. 201841002148

(51) Int. Cl.
H04L 12/859 (2013.01)
H04L 12/813 (2013.01)
H04L 12/931 (2013.01)
H04L 12/863 (2013.01)

(52) U.S. Cl.
CPC .......... H04L 47/2475 (2013.01); H04L 47/20 (2013.01); H04L 47/6255 (2013.01); H04L 49/205 (2013.01); H04L 49/356 (2013.01)

(58) Field of Classification Search
CPC . H04L 47/20; H04L 47/2475; H04L 47/6255; H04L 49/205; H04L 49/356
See application file for complete search history.

(56) References Cited

U.S. PATENT DOCUMENTS 7,706,393 B2   4/2010 Hill
9,948,566 B2   4/2018 Nayak et al.
2003/0182422 A1 9/2003 Bradshaw et al.
(Continued)

OTHER PUBLICATIONS

FCoE Initiation Protocol, Cisco Nexus 5000 Series Switches, downloaded on Oct. 2, 2015, at: http://www.cisco.com/c/en/us/products/collateral/switches/nexus-7000-seri- es-switches/white_paper_c11-560403.html, 9 pages.
(Continued)

Primary Examiner — Benjamin H Elliott, IV
(74) Attorney, Agent, or Firm — Patterson + Sheridan, LLP

(57) ABSTRACT

Certain embodiments described herein are generally directed to enforcing application-specific quality of service (QoS) requirements over a storage network. The method for enforcing application-specific quality of service (QoS) requirements over a storage network includes receiving an input-output (I/O) command from a virtual machine executing an application, wherein the I/O command corresponds to an I/O request generated by the application and is tagged with a QoS classification corresponding to QoS requirements of the application, determining a QoS value corresponding to the QoS classification of the I/O command, and transmitting a data frame including the I/O command and the QoS value to a target network adapter through a switch fabric in a network, the switch fabric having a plurality of switches each configured to forward the data frame based on the QoS value.

14 Claims, 7 Drawing Sheets

(56) References Cited

U.S. PATENT DOCUMENTS

| | | |
|---|---|---|
| 2006/0230218 A1 | 10/2006 | Warren et al. |
| 2010/0091658 A1 | 4/2010 | Nguyen et al. |
| 2010/0128605 A1 | 5/2010 | Chavan et al. |
| 2010/0250785 A1* | 9/2010 | Shin .................. G06F 3/0613 710/3 |
| 2011/0010427 A1* | 1/2011 | Jnagal ................ G06F 3/0605 709/213 |
| 2011/0302287 A1* | 12/2011 | Muppirala ............ G06F 9/5077 709/223 |
| 2012/0177039 A1* | 7/2012 | Berman ................ H04L 45/02 370/390 |
| 2012/0317270 A1 | 12/2012 | Vrbaski et al. |
| 2013/0163607 A1 | 6/2013 | Shukla et al. |
| 2014/0036673 A1* | 2/2014 | Ehara ................. H04L 45/302 370/230.1 |
| 2015/0113529 A1 | 4/2015 | Zhong |
| 2015/0113534 A1* | 4/2015 | Kanda .................. H04L 47/10 718/1 |
| 2016/0014631 A1 | 1/2016 | Wang et al. |
| 2016/0094480 A1* | 3/2016 | Kulkarni ............. H04L 47/805 370/230 |
| 2016/0127191 A1 | 5/2016 | Nair |
| 2017/0171019 A1* | 6/2017 | Nayak ................. G06F 16/122 |
| 2018/0054761 A1* | 2/2018 | Pathak ............... H04L 47/2433 |
| 2018/0227225 A1* | 8/2018 | Zhai .................... H04L 29/08 |
| 2019/0222522 A1* | 7/2019 | Shih .................... H04L 47/20 |

OTHER PUBLICATIONS

VMware High Availability, Concepts, Implementation, and Best Practices, White Paper, VMware, Inc., 2007, 29 pages.

\* cited by examiner

| Flow Table 670 | | |
| --- | --- | --- |
| Headers 672 | Counter 673 | Actions 674 |
| EtherType=<FCoE><br>IngressPort=<1><br>FC_CSCTL=<H_QOS> | 4 | Forward to EgressPort=<2><br>Queue=H_PriorityQueue> |
| EtherType=<FCoE><br>IngressPort=<1><br>FC_CSCTL=<M_QOS> | 8 | Forward to EgressPort=<6><br>Queue=M_PriorityQueue> |
| EtherType=<FCoE><br>IngressPort=<1><br>FC_CSCTL=<L_QOS> | 2 | Forward to EgressPort=<3><br>Queue=L_PriorityQueue> |
| EtherType=<RDMA><br>IngressPort=<5><br>FC_CSCTL=<H_QOS> | 1 | Forward to EgressPort=<8><br>Queue=H_PriorityQueue> |

Fig. 6

POLICY AWARE FRAMEWORK FOR APPLICATION INPUT OUTPUT MANAGEMENT

RELATED APPLICATIONS

Benefit is claimed under 35 U.S.C. 119(a)-(d) to Foreign Application Serial No. 201841002148 filed in India entitled "POLICY AWARE FRAMEWORK FOR APPLICATION INPUT OUTPUT MANAGEMENT", on Jan. 18, 2018, by VMware, Inc., which is herein incorporated in its entirety by reference for all purposes.

BACKGROUND

In a virtual data center environment, multiple host computers each running a number of virtual machines may communicate together with a storage array over a switch fabric. The virtual machines, in some cases, run one or more user and/or server applications, each running workloads to meet users' demands. Each application running on these virtual machines typically demands a different quality of service, which corresponds to certain requirements with respect to packet loss, bit rate, throughput, latency, scalability, availability, and/or jitter etc. For example, a database server application and a file system virus scanning application running on the same virtual machine have different service policies that have different quality of service requirements. I/O latency, for instance, is a much more critical performance factor for the database server application than the file system virus scanning application. However, in some cases, various types of application I/O traffic with different QoS requirements may share and compete for the same resources leading to significantly suboptimal performance by applications with high QoS requirements.

BRIEF DESCRIPTION OF THE DRAWINGS

FIG. 6 illustrates an example flow table for use by one or more of the switches of FIG. 1.

DETAILED DESCRIPTION

Figure 1:
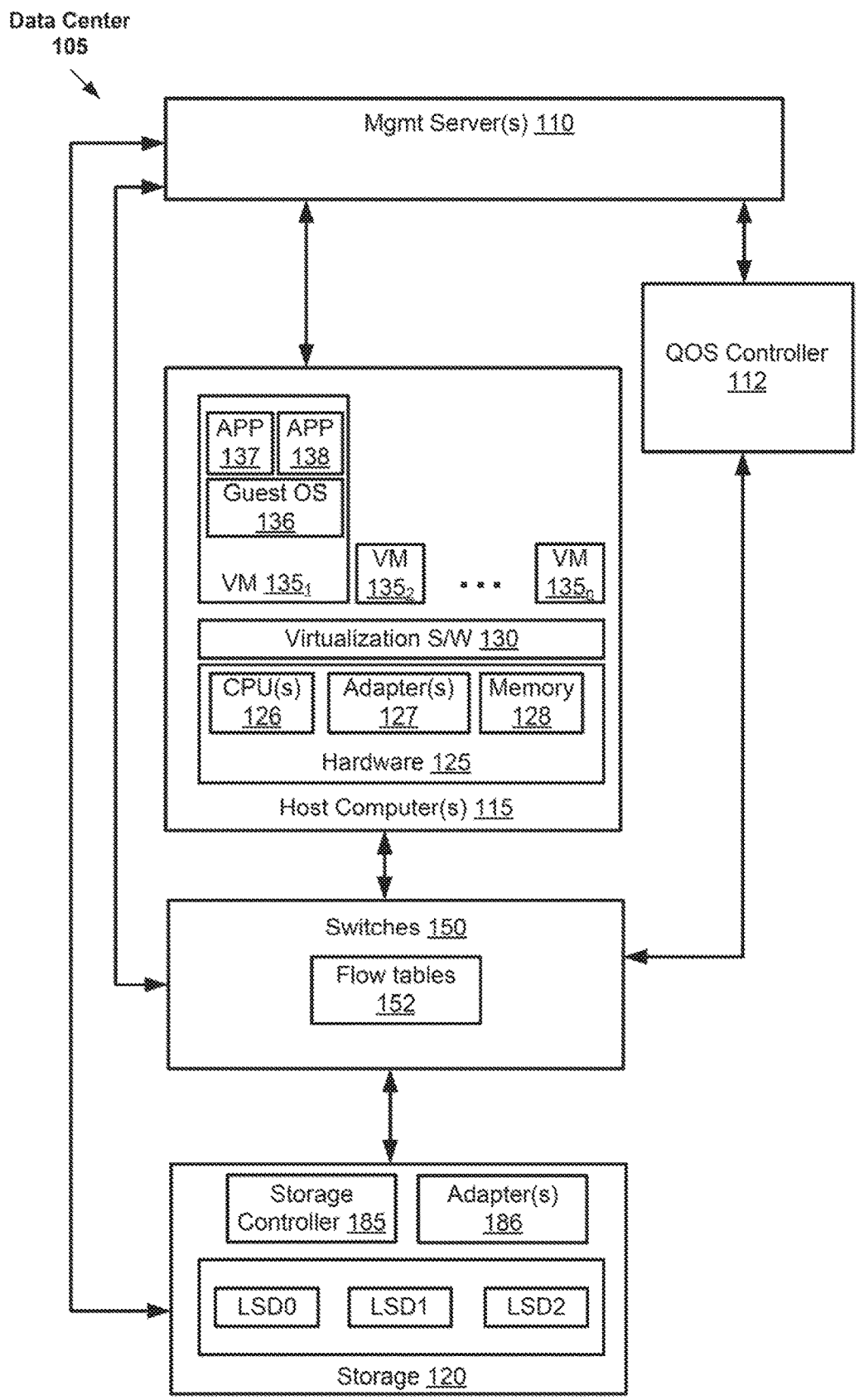
FIG. 1 illustrates, in block diagram form, an exemplary data center environment implementing a network for connecting a number of network nodes, including host computers, switches, and storage devices.

FIG. 1 illustrates an example block diagram of a data center environment including one or more networked processing devices implementing the deployment of network nodes and the management of network traffic. While the present description includes examples that reference a data center, embodiments are not limited to a particular scale of source and/or target sites. References to a data center may be used interchangeably with a physical computing site that, e.g., houses one or more host computer systems, storage devices, and associated networking components. References to network nodes include the hosts, switches, and storage that make up a data center.

Data center 105 includes management server(s) 110, a quality of service (QoS) controller 112, one or more host computers 115, one or more switches 150, and storage 120. As described in U.S. application Ser. No. 14/964,411, which is incorporated herein by reference, management server(s) 110 include components that enable determining the physical topology data of network nodes (e.g., host computers 115, switches 150, storage 120, etc.) as well as the capabilities of each network node. QoS controller 112, as described below, is a software application that receives information from management server(s) 110 to discover physical topology and device capability in order to configure end-to-end capability-aware network paths for enforcing quality of service (QoS) requirements associated with various types of network traffic.

Data center 105 also includes one or more host computers 115. Each host 115 includes hardware 125, virtualization software layer 130 (also referred to as a hypervisor), and virtual machines (VMs) $135_1$-$135_n$. VMs 135 are complete computation environments, containing virtual equivalents of the hardware and system software components of a physical system and are typically implemented by an extensive virtualization infrastructure which includes a variety of software and hardware components. For example, one or more of the VMs may implement virtual desktops. A virtual desktop is a virtual computing system that operates as a desktop or workstation computer with which an end user can interact using a desktop remoting protocol over a network. In some embodiments, one or more of the VMs implement a virtualized compute, networking, storage, and/or security service (e.g., a firewall, webserver, database server, etc.). For example, as shown in FIG. 1, VM $135_1$ runs a guest operating system (OS) 136 configured to execute one or more user and/or server applications, including applications 137 and 138. As an example, application 137 may be a database server application while application 138 may be a webserver application. VMs $135_2$-$135_n$ may include one or more of the components illustrated in VM $135_1$. For the sake of simplicity, however, only VM $135_1$ is illustrated with internal components.

In some embodiments, host 115 may include operating system level virtualization software containers such as those provided by companies such as Docker. In other embodiments, host 115 includes both VMs and software containers.

Virtualization software layer 130 runs on hardware 125 of host 115 (e.g., a physical computer) and manages one or more VMs 135. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk or other logical storage device within underlying storage 120.

Hardware 125 includes one or more processors 126 ("CPU(s)"), data storage and memory 128, and network adapters 127 (e.g., network interface controller (NIC), host bus adapter (HBA), and/or converged network adapter (CNA) etc.). Data storage and memory 128 may be used for storing data, metadata, and programs for execution by the processor(s). Data storage and memory 128 may include one or more of volatile and non-volatile memories, such as Random Access Memory ("RAM"), Read Only Memory ("ROM"), a solid state disk ("SSD"), Flash, Phase Change Memory ("PCM"), or other types of data storage, such as magnetic disk drives, optical disk drives, etc. One or more buses (not shown) may be used to interconnect the various components of hardware 125.

Each of storage 120 includes one or more physical storage devices. Storage 120 also includes network adapters 186 (e.g., network interface controller (NIC), host bus adapter (HBA), and/or converged network adapter (CNA) etc.) to allow storage 120 to communicate with other network nodes in data center 105 through a network (e.g., SAN). In some embodiments, storage 120 includes storage controllers 185 to serve read and write requests and management commands/queries from host computers 115 and management servers 110. Each of storage 120 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. For example, storage 120 is illustrated as including logical storage devices LSD0, LSD 1, and LSD2 within array 186. Each of storage 120 may include additional arrays, logical storage devices (LSDs), or other partitions of storage.

In some embodiments, each LSD in storage 120 has a queue depth, which represents the number of I/O operations (e.g., small computer system interface (SCSI) commands) that can run in parallel on the LSD. In other words, the queue depth is the number of I/O requests that an initiator (e.g., adapter(s) 127 of host computer(s) 115) can send and receive per logical storage device. For example, each I/O request destined for a certain LSD occupies a queue entry in the LSD's queue such that at any point in time the LSD's queue depth indicates the number of outstanding I/O requests associated with the LSD.

Data center 105 also includes one or more storage area network (SAN) switches 150 or similar switches that couple host computers 115 to storage 120. In some embodiments, one or more of the illustrated switches 150 are virtual switches implemented by one or more hosts 115. In some embodiments, switches 150 are Open vSwitch (OVS) switches, each of which is an open-source implementation of a distributed multi-layer switch. The OVS switches are OpenFlow capable switches that provide a switching stack for hardware virtualization environments. OpenFlow is a communications protocol that gives access to the forwarding plane of a network switch (e.g., OVS) over the network.

As described above, host computers 115, or VMs 135 running thereon, may communicate with storage 120, for data storage and retrieval, through a network, such as a SAN. Through this network, VMs 135 may use the pool of storage provided by storage 120, for example, to store virtual disks that are accessed by VMs 135 during their operation. In some embodiments, the network is a converged network that combines or consolidates storage traffic and data traffic on a single network.

In some embodiments, the converged network is a Fibre Channel over Ethernet (FCoE). FCoE is a type of SAN that enables sending Fibre Channel frames directly over an Ethernet network. FCoE allows for a lossless transmission of storage data between host computers 115 and storage 120. In a traditional storage area network (SAN) and LAN environment, host computers may have an Ethernet adapter (e.g., network interface controller (NIC)) for data traffic and a Fibre Channel host bus adapter (HBA) for storage traffic. However, with FCoE, these two adapters, in some embodiments, are replaced by a converged network adapter (CNA) that services both protocol stacks. For example, in some embodiments, adapters 127 of host computers 115 as well as adapters 186 of storage 120 include CNAs that allow connectivity to a FCoE SAN through lossless FCoE switches 150.

In some embodiments, where the converged network is an FCoE network, switches 150 are Fibre channel forwarders (FCFs), which are FC switching elements in an FCoE network. FCFs provide functions that are analogous to the functions provided by FC switches in a traditional Fibre channel (FC) network. For example, the most basic function is the forwarding of FCoE frames received on one port to another port based on the destination address in the encapsulated FC frame. The FCFs handle FC logins, routing, zoning, and other FC services. These FC services and functions still exist in an FCoE network. FCFs might also have existing FC ports that connect to traditional Fibre Channel SANs. For example, FCFs provide a gateway function between FCoE and FC, transmitting frames between the two types of networks. In practice, this case applies to many or most early FCoE.

In some embodiments, the converged network is a remote direct memory access (RMDA) over Converged Ethernet (RoCE) network. RoCE is a standard protocol which enables RDMA's efficient data transfer over Ethernet networks allowing transport offload with hardware RDMA engine implementation. RDMA provides direct memory access from the memory of one host (storage or compute) to the memory of another host without involving the remote Operating System and CPU, boosting network and host performance with lower latency, lower CPU load and higher bandwidth.

As described above, VMs 135 may use the pool of storage provided by storage 120, for example, to store virtual disks that are accessed by VMs 135 during their operation through a converged network, such as a FCoE or RoCE network. For example, applications running on a VM 135 may generate read or write requests to a storage stack provided by an underlying virtualization software (shown in FIG. 2) for transmission to storage 120 over the SAN. In some cases, one or more VMs 135 may run applications or workloads with a higher quality of service (QoS) requirements than applications being run by other VMs. In such cases, performance may be degraded (e.g., high latency) if the VMs running high QoS workloads are competing for storage and/or network resources again VMs running low QoS workloads. Accordingly, in some cases, the host computer(s) 115 and storage 120 may be configured with a storage I/O control (SIOC) functionality that enables the allocation of more resource shares to VMs that are running high priority applications, ensuring that the VMs can maintain a higher level of performance during peak load periods. For example, when there is congestion (the latency is higher than the configured value) with respect to a certain LSD, SIOC enables the storage stack to reduce the latency by throttling back the LSD's queue depth in the network adapters of VMs 135 that are using excessive I/O.

However, SIOC addresses the LSD queue depths on a per-VM basis and not on a per-application basis. In other words, although SIOC prioritizes and assigns more resource shares to I/O requests of a certain VM over others, it treats I/O requests of all applications running on a VM the same with respect to QoS. This is while, in some embodiments, each application has a service policy that is different from service policies of other applications running on the same VM. A service policy specifies an application's requirements with respect to QoS (e.g., packet loss, bit rate, throughput, latency, scalability, availability, jitter etc.) for service agreement compliance and enforcement. For example, application 137 may be a database server with higher QoS requirements than application 138, which may be a file system virus scanning application. Providing applications 137 and 138 with the same network resources or QoS, however, may lead to a suboptimal performance by application 137.

In addition, current Ethernet local area network (LAN) communications protocols (e.g., such as Data Center Bridging (DCB) used for converged networks) deployed in data centers are unable to provide end-to-end bandwidth and QoS control. For example, current DCB networks' enforcement of bandwidth and QoS control is only limited to the immediate network hop. This lack of end-to-end bandwidth and QoS enforcement, however, leads to performance bottlenecks, which are difficult to troubleshoot and fix in real-time.

Accordingly, certain embodiments described herein relate to implementing a policy aware framework for end-to-end application-specific I/O QoS management over a converged network. In order for application I/O requests to be serviced according to their corresponding service policies' specific QoS requirements, in some embodiments, QoS controller 112 configures end-to-end data paths between network nodes (e.g., host computers 115 and storage 120) based on network topology data as well as the capabilities of various network nodes (e.g., host computers 115, storage 120, and switches 150). QoS controller 112, as described above, is a software application that, in some embodiments, resides and runs on host computer(s) 115. For example, the software application may run on a VM 135 on host computer 115. In some embodiments, QoS controller 112 resides and runs on a physical computing device other than host computers 115 (e.g., management server(s) 110). QoS controller 112 receives information including network topology data as well as the network node capabilities from management server(s) 115 through one or more application programming interfaces (APIs).

As described in U.S. application Ser. No. 14/964,411, management server(s) 110 includes components that allow for discovering the physical network topology as well as the capabilities of the network nodes.

More specifically, as described in U.S. application Ser. No. 14/964,411, in some embodiments, management server 110 receives physical topology data from one or more switches 150. For example, as a part of powering on, each host computer 115 transmits link layer discovery protocol (LLDP) data to a switch 150 to which it is coupled. The LLDP data includes a unique address or identifier for the host. Similarly, storage 120 and switches 150 also transmit link layer discovery data as a part of the discovery process. Each switch 150 forwards the received LLDP data to management server 110. Management server 110 then transmits a LLDP response to the switch and the switch forwards the response to the sender. As a result, management server 110 receives an indication of which network nodes (e.g., hosts, switches, and storage) are coupled to which switches. In other words, management server 110 stores an indication of which network nodes are physically connected, or "neighbors," within the network. Using this data, management server 110 determines the physical topology of the network in data center 105.

In order to discover the capabilities of the network nodes, management server 110 transmits a query to each of one or more network nodes within the network. The query includes a request for the capabilities of each network node. For example, management server 110 transmits a query to storage 120 to request the capabilities of each storage 120 coupled to management server 110. In some embodiments, the query is transmitted via an out-of-band connection between management server 110 and storage 120. In some embodiments, management server 110 also queries the capabilities of other network nodes. For example, management server 110 may query hosts computers 115 to request each host's capabilities and query switches 150 to request each switch's capabilities.

In response to each query described above, management server 110 receives network node capabilities. For example, each storage 120 may respond to the query with service-level characteristics including one or more of storage type, storage capacity, failure tolerance, cache size, performance speed, etc. Each host 115 may respond to the query with service-level characteristics including capacity, cache size, performance speed, availability, application support, etc. Each switch may respond to the query with service-level characteristics including bandwidth, throughput, processing power, etc. Additionally, network nodes may respond with fabric, transport, or other storage protocol login parameters. For example, the response may include port login (PLOGI) parameters such as buffer to buffer credit (indicating the number of buffers available at the transmission end), total concurrent sequences, open sequences per exchange, resource allocation time out value, error detect time out value, max data that can be received in a frame, support for continuously increasing offset, support for random relative offset, etc.

Subsequently, in some embodiments, management server 110 receives a request to create a cluster. In some embodiments, the request includes one or more minimum service-level characteristics for the cluster. For example, an administrator transmits a request to deploy a particular number of virtual desktops or other applications with specific storage capacity and capabilities. Based on the requested network node capabilities, management server 110 selects network nodes to create the cluster. For example, management server 110 parses the capabilities data structure and selects hosts 115 that meet or exceed the threshold service-level characteristics defined by the request to create the cluster. Similarly, management server 110 may parse the capabilities of storage 120 to select storage 120 that meet or exceed the threshold service-level characteristics defined by the request to create a storage pool for the cluster. In some embodiments, management server 110 also uses the determined network topology to select network nodes to create the cluster. For example, the service-level characteristics defined by the request may require that hosts 115 have redundant paths through different switches to reach storage 120 or meet a network round trip time or throughput value that is affected by the number of switches or types of switches between hosts 115 and storage 120.

As described above, each VM 135 runs one or more applications, each having a service policy that specifies certain QoS requirements. In order for the I/O traffic associated with each of these applications to be carried according to the application's corresponding QoS requirements, as described above, QoS controller 112 configures end-to-end network paths between host computer(s) 115 and storage 120 within the created cluster based on the physical network topology as well as the network node capabilities.

As described above, in some embodiments, QoS controller 112 is able to obtain information relating to the physical network topology as well as the network node capabilities from management server(s) 110 through one or more APIs. In some other embodiments, QoS controller 112 obtains network node capabilities by directly querying switches 150 and storage 120 using out of bound APIs provided by switches 150 and storage 120.

Having determined the physical network topology as well as the network node capabilities, QoS controller 112 determines network paths for carrying network traffic with different QoS classifications. In some embodiments, these classifications are defined by network administrators based on the needs and business logic of the entity that utilizes the network. As such, various classifications using various naming conventions may be defined. As an example, network traffic generated by VMs 135 may be categorized into three groups of high, medium, and low QoS. In another example, network traffic generated by VMs 135 may be categorized into three groups of 1, 2, and 3, where 1 corresponds to a high QoS requirements, 2 corresponds to lower QoS requirements, and 3 corresponds to the lowest QoS requirements. As described below in relation to FIGS. 2-3, each I/O request generated by an application running on a VM 135 is tagged with one of these defined QoS classifications, which helps the switch fabric prioritize the I/O request accordingly and also determine the appropriate network path configured for carrying the I/O request. These classifications also help the storage array (e.g., storage 120) to prioritize and assign appropriate resources when servicing an I/O request based on the I/O request's QoS classification.

In some embodiment, one or more QoS classifications are also defined to enable host computers to allocate appropriate bandwidth to certain I/O requests that require especially large bandwidths. For example, as further described in relation to FIG. 3, in some embodiments, based on an application's service policy, a QoS classification referred to as "TakeAll-QoS," is defined. The TakeAll-QoS classification, as further described in relation to FIG. 3, specifies a certain amount of bandwidth (e.g., all the bandwidth) required by an application. In some embodiments, the bandwidth is defined with respect to the LSD queue depth allocated to the application's I/O traffic.

One of skilled in the art appreciates that these classifications or categories, as described above, may be customized depending on many factors, such as customer needs or business logic. As such, each classification is designated to identify a certain level of QoS but the naming of these classifications (e.g., high, medium, low or 1, 2, 3) or the number of classifications (e.g., high, medium-high, medium, low-medium, low, etc.) may vary. In addition, these classifications may be relative, meaning that, for example, what is considered a "high" level of QoS, which is defined and configured based on customer needs and business logic, may be different from another customer's definition of a high QoS classification.

Based on these QoS classifications and using the information obtained relating to the network node capabilities (e.g., capabilities of switch 150, storage 120), QoS controller 112 determines one or more network paths for carrying network traffic for each of these different QoS classifications. For example, QoS controller 112 determines one or more network paths for carrying high QoS application I/O traffic, one or more network paths for carrying medium QoS application I/O traffic, one or more network paths for carrying low QoS application I/O traffic, and one or more network paths for carrying no-QoS (e.g., the application's I/O traffic is not tagged with any QoS classification) application I/O traffic. Once the network paths have been determined, QoS controller 112 (either directly or through management servers(s) 110) transmits instructions to switches 150 to program the paths into the switch flow table(s) 152. In some embodiments, QoS controller 112 dynamically reconfigures network paths by sending new instructions to switches 150 in response to changes in the network topology and/or capabilities of the switches, etc. For example, if a certain switch with high processing and bandwidth capabilities is replaced by another switch with lower capabilities, QoS controller 112 may reconfigure the network paths to ensure that the switch with the lower capabilities is not used for a network path that is configured to carry high QoS data frames. As a result, QoS controller 112 periodically communicates with management servers 110 to obtain information relating to the current network topology and the capabilities of the network nodes.

In some embodiments, after the flow tables of switches 150 are configured and programmed, management server 110 determines fabric, transport, or other storage protocol login service parameters for the selected hosts 115, SAN switches 150, and storage 120 in the cluster. For example port login (PLOGI) and process login (PLRI) parameters received from hosts 115 and storage 120 are compared and management server 110 selects compatible values for those parameters in order for the selected hosts 115 and storage 120 to communicate. As a result, each host 115 does not need to attempt to negotiate these parameters as a part of the login process to establish a session with storage 120. In some embodiments, management server 110 creates or selects a unique initiator identifier for each host 115 and a unique target identifier for each storage 120 to further facilitate the communication between hosts 115 and storage 120. In some embodiments, the login parameters received from hosts 115, SAN switches 150, and storage 120 are compared and management server 110 selects compatible values for those parameters in order for the selected hosts 115 and SAN switches 150 to communicate without negotiating fabric protocol parameters and for storage 120 and SAN switches 150 to communicate without negotiating fabric protocol parameters. Subsequently, management server 110 transmits the determined protocol parameters to the selected network nodes. Additionally, management server 110 may transmit the initiator or target identifier to each host 115 or storage 120. As a result of this, end-to-end network paths are discovered and established at this point. In some cases, hosts 115 may bypass the negotiation of transport protocol login service parameters and, using the parameters and identifiers from management server 110, proceed directly to transmitting I/O requests to storage.

In some embodiments, with respect to a FCoE network, the FCoE Initiation Protocol (FIP) is used for enabling initiator network nodes (e.g., host computers 115, storage 120) and target network nodes (e.g., host computers 115, storage 120) to discover and establish end-to-end network paths among each other. For example, in such embodiments, after powering on, an end device (e.g., host computers 115, storage 120) broadcasts a FIP VLAN (virtual local area network) request to a well-known address for all FCFs. The FCFs may then respond with a VLAN Notification frame that lists VLANs that the end device can use. Subsequently, the end device discovers FCFs that it is allowed to log into by broadcasting a Discovery Solicitation frame in the discovered VLAN. The FCFs then respond with Discovery Advertisement frames, which contain information such as a FCF priority and the identifier of the fabric to which the FCF connects. Based on the Discovery Advertisement frames, the end device determines which FCF it wishes to connect to for fabric login and sends an FIP Fabric Login (FLOGI) request to the FCF to log in to the fabric. The FCF replies with a FLOGI Accept frame and the login is complete, resulting in links being established between the end device and the FCF. As a result, once the FIP process is complete, each network node initiator in the cluster can discover and log-in to selected target network nodes to establish end-to-end paths. Subsequently, the network node initiators, such as host computers 115, may then proceed to transmitting I/O requests to network node targets, such as storage 120, through the FCFs.

Figure 2:
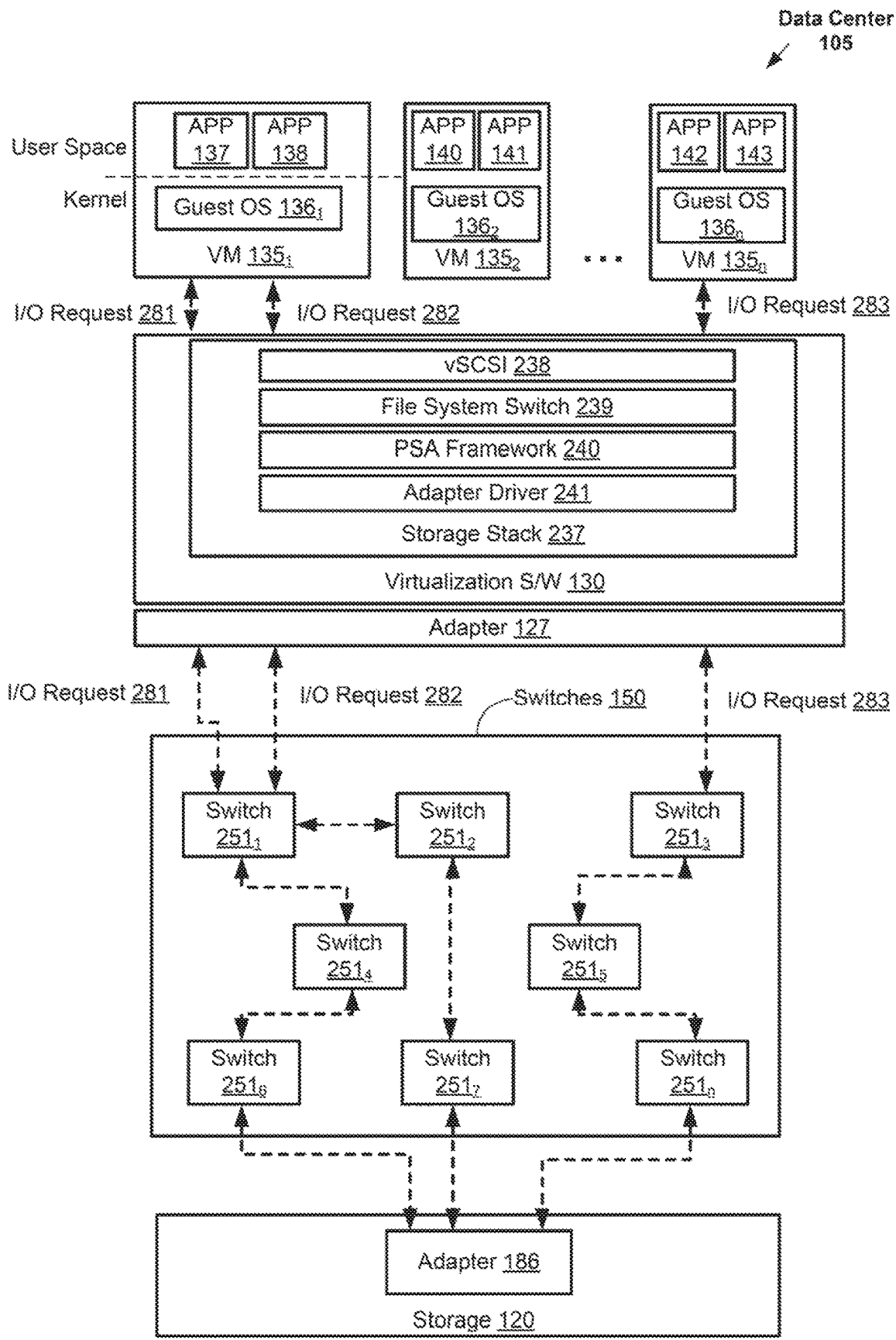
FIG. 2 illustrates, in more detail, components of virtual machines running on the host computers of FIG. 1 as well as a number of network paths configured based on capabilities of the switches of FIG. 1.

FIG. 2 illustrates example I/O requests being transmitted by the VMs of the host computer of FIG. 1 (e.g., host computer 115) to the storage array (e.g., storage 120) through the switch fabric (i.e., switches 150) configured by the QoS controller 112 of FIG. 1. FIG. 2 shows VMs 135$_1$-135$_n$ of host computer 115 of FIG. 1 (not shown in FIG. 2) each running one or more applications (e.g., applications 137-143). Applications 137-143 running in the user-space of the VM 135 may be firewall, webserver, database server, or other types of applications each having a certain type of service policy, as described above. As shown, I/O requests generated by applications 137-143 pass through different layers of storage stack 237, that is part of virtualization software 130, before traveling through the wire to reach storage 120.

As shown in FIG. 2, the kernel of VM 135$_1$ includes guest OS 136$_1$ that interacts with virtualization S/W 130. Guest OS 136 is an operating system running on VM 135$_1$. Virtualization software 130 provides VMs 135, including VM 135$_1$, with storage stack 237, which includes virtual SCSI (vSCSI) 238, file system switch (FSS) 239, pluggable storage architecture (PSA) framework 240, and adapter driver 241. VSCSI 238 acts as a SCSI frontend for the VM kernel by taking SCSI requests and virtualizing the I/O requests to file I/O requests. FSS 239 is an abstraction of a file system residing in storage 120. The purpose of FSS 239 is to allow applications (e.g., 137, 138, etc.) to access different types of file systems in a uniform way. FSS 239 can, for example, be used to access local and network storage devices (e.g., storage 120) transparently without the application (e.g., 137, 138, etc.) noticing the difference. PSA framework 240 is a layer including a collection of VM kernel APIs that allow third party hardware vendors to insert code directly into the storage I/O path of VM 135 for managing storage multipathing. Adapter driver 241 provides an interface for communication with adapter 127. Adapter 127, as described above, may be a hardware network interface controller (NIC), host bus adapter (HBA), and/or converged network adapter (CNA), depending on the type of network the adapter is providing a connection to. Adapter 127 provides host computer 115 and VMs 135 running thereon with a connection to switches 150. As shown, VMs 135 communicate with adapter 127 through storage stack 237 that is provided by virtualization S/W 130.

As described above, based on the network node capabilities (e.g., capabilities of switch 150), QoS controller 112 determines one or more network paths for carrying network traffic with different QoS classifications and then transmits instructions to switches 150 to program the network paths into the switch flow table(s) 152. After end-to-end network paths between host computer 115 and storage 120 have been established, I/O requests generated by applications running on VMs 135 are transmitted through different network paths depending on the QoS classification associated with the applications generating the I/O requests. For example, as further described in relation to FIG. 3, storage stack 237 is, in some embodiments, configured to tag I/O requests with QoS classifications based on the QoS requirements indicated by the respective service policies of the applications generating the I/O requests. The tagged I/O requests then travel through the different layers shown in FIG. 2 until they reach the initiator adapter driver (e.g., adapter driver 241), where their QoS classifications are interpreted and mapped to standardized QoS values, which are inserted into data frames that carry the I/O requests over the network. The data frames then travel through appropriate network paths that have been configured to enforce the QoS requirements of the data frames as indicated by the standardized QoS values inserted into the data frames by the initiator adapter driver.

For example, application 137 may be a database application with a service policy that requires a high QoS. In such an example, as further described in relation to FIG. 3, data frames corresponding to I/O request 281 generated by application 137 travel through a network path configured by QoS for carrying high QoS data frames. As shown, data frames of I/O request 281 are routed through switches 251$_1$, 251$_4$, and 251$_6$, corresponding to a network path capable of carrying high QoS data frames. On the other hand, application 138 may be a file system virus scanning application with a service policy that requires a low QoS. In such an example, data frames corresponding to I/O request 282 generated by application 138 travel through a network path configured by QoS controller 112 for carrying low QoS data frames. As shown, data frames of I/O request 282 are routed through switches 251$_1$, 251$_2$, and 251$_7$ corresponding to a network path configured for carrying low QoS data frames. In addition, I/O request 283 is, for example, generated by application 142 running on VM 135$_n$ and travels through a network path that is configured for carrying medium QoS data frames.

Figure 3:
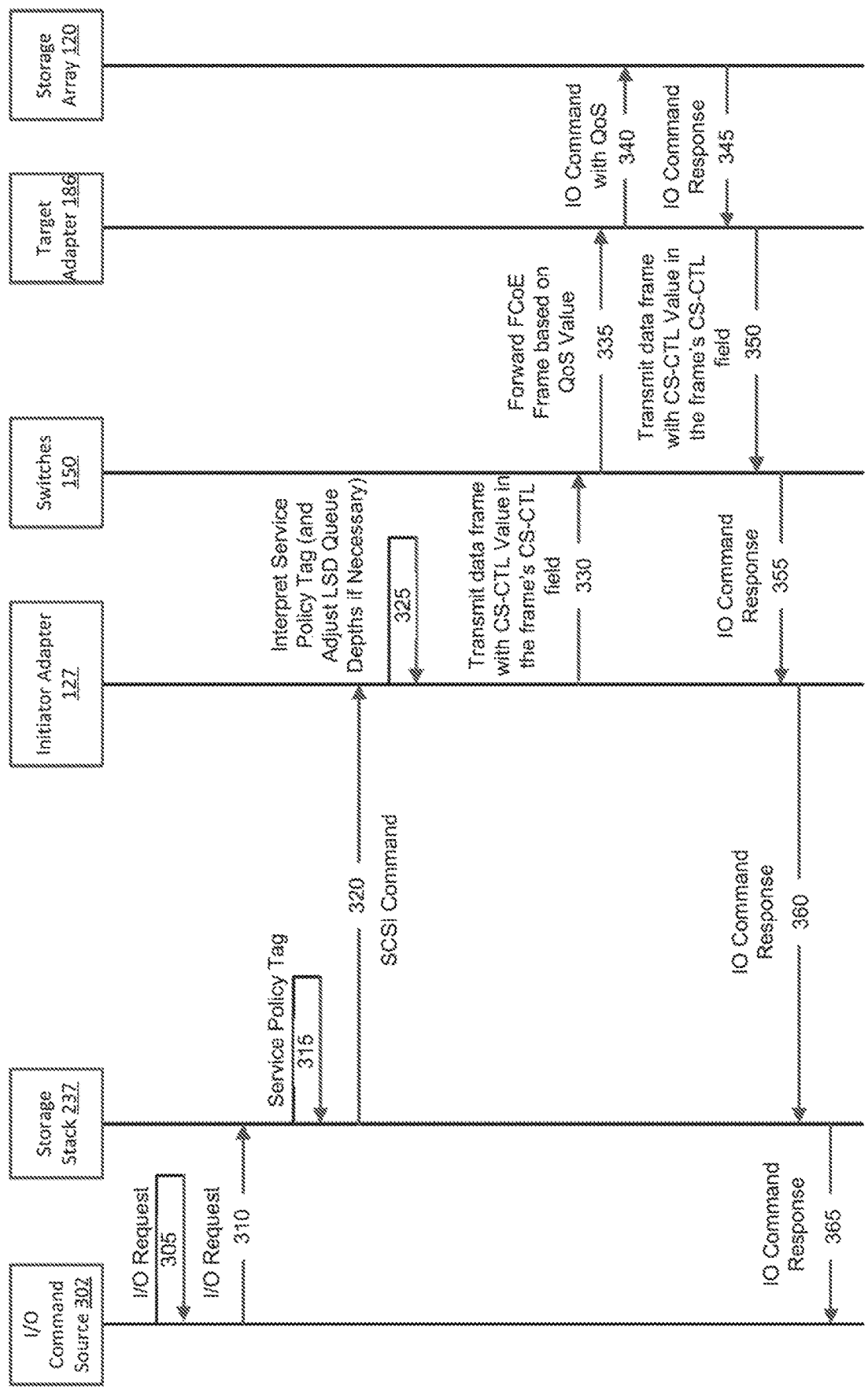
FIG. 3 illustrates a sequence diagram for data transmission in a policy aware framework implemented in a converged network.

FIG. 3 illustrates an example sequence diagram of data transmission in a policy aware framework implemented in a converged network. FIG. 3 illustrates, in further detail, how an I/O request generated by an application is tagged with a QoS classification and how the I/O request is converted to a SCSI command that travels over the network in data frames that carry the I/O request's respective QoS classification. FIG. 3 also illustrates LSD queue depth adjustments by the storage stack 237 when processing I/O requests with a bandwidth related QoS classification, which may be referred to as TakeAll-QoS, as described above. The steps of FIG. 3 are described with reference to FIGS. 1-2, and 4-7.

At step 305, I/O command source 302 within a VM 135 generates an I/O request (e.g., read or write). I/O command source 302, in some embodiments, is an application (e.g., application 137) running in the user-space of a VM 135 on host computer 115. Application 137, for example, may be a database server application that generates a read request to fetch certain data stored in a certain LSD in storage 120. In addition, application 137 has a service policy that specifies certain QoS requirements.

At step 310, the I/O request generated by I/O command source 302 reaches storage stack 237 in the form of an I/O system call to the VM 135's guest OS 136 in the kernel.

At step 315, storage stack 237 creates a SCSI command using the SCSI protocol in response to receiving the I/O request from the user space and then tags the SCSI command with a QoS classification based on QoS requirements associated with the I/O request. In some embodiments, storage stack 237 determines the QoS requirements associated with the I/O request based on the type of the application that has generated the I/O request. In some embodiments, storage stack 237 is able to determine the type of the application based on an indication that is tagged to the I/O request in the user space of the VM 135's guest operating system. For example, in some embodiments, VM 135's guest operating system (e.g., guest OS 136) includes a file system driver that determines the type of application that is generating the I/O request and tags (e.g., using a flag) the I/O request with the application type. The file system driver then sends the tagged I/O request to the block layer of the guest operating system where a paravirtual SCSI driver intercepts the I/O request and passes it to vSCSI 238 in storage stack 237. Having determined the application type, in some embodiments, storage stack 237 determines the application's QoS classification by utilizing a mapping that maps application types to QoS classifications. Once the QoS classification is determined, a layer within storage stack 237 tags the SCSI command with the QoS classification. For example, in some embodiments, a field within the SCSI command structure is set using the determined QoS classification.

In some embodiments, the layer within storage stack 237 at which the SCSI command is tagged depends on the layer at which the I/O command is created and issued. For example, for application traffic generated by an application (e.g., application 137) running on a VM 135, each SCSI command is tagged at vSCSI 238 with a QoS classification of the application generating the traffic. In another example, traffic corresponding to a live migration (e.g., vMotion) of a running VM 135 to another physical host computer, the QoS classification tagging is done during the pre-copy of vMotion. For Storage vMotion traffic, data copying is performed by a virtual machine file system (VMFS) Data Mover component and, therefore, I/O commands generated by the Storage vMotion component are tagged with a corresponding QoS classification (e.g., "storage vMotion") at the VMFS layer. In yet another example, RMDA traffic is tagged by a corresponding QoS classification (e.g., "RMDA service tag") at a para virtual RDMA device emulation layer in the VM 135's kernel.

At step 320, storage stack 237 then sends the tagged SCSI command to initiator adapter 127.

Figure 4:
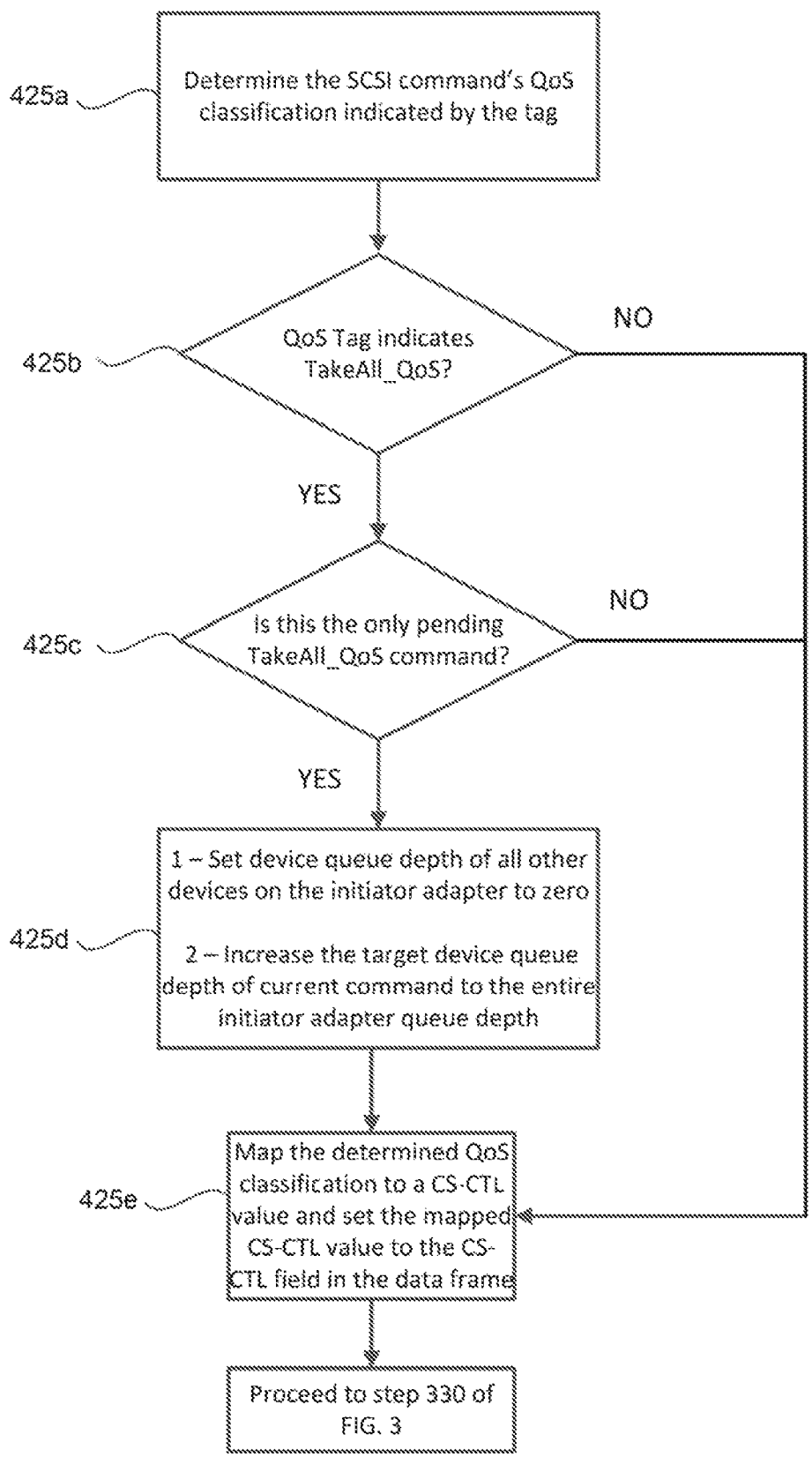
FIG. 4 illustrates example operations for use by an initiator adapter driver when processing an outgoing input/output (I/O) request.

At step 325, acting as an interface for initiator adapter 127, initiator adapter driver 241 receives the tagged SCSI command from storage stack 237. Subsequently, initiator adapter driver 241 is configured to then extract the QoS classification tag from the SCSI command and perform a series of steps shown in FIG. 4. FIG. 4 illustrates, in more detail, example steps that initiator adapter driver 241 may follow based on what is indicated by the SCSI command's QoS classification tag.

At step 425a, initiator adapter driver 241 determines (interprets) the QoS classification indicated by the SCSI command's QoS classification tag. As described above, the tag may indicate a QoS classification from a variety of possible QoS classifications (e.g., high QoS, low QoS, TakeAll-QoS, etc.)

At step 425b, initiator adapter driver 241 determines if the tag indicates a TakeAll-QoS classification. As described above, in some embodiments, the TakeAll-QoS classification specifies the amount of bandwidth required by the SCSI command within storage stack 237. For example, the SCSI command is generated for a target LSD, in which case, for instance, the bandwidth is defined in terms of the size of the target LSD's queue depth allocated to the SCSI command in storage stack 237.

As described above, an LSD's queue depth is the number of I/O requests that initiator adapter 127 is able to send and receive to a corresponding LSD. Storage stack 237 is configured with these LSD queue depths, each of which is associated with a certain LSD (e.g., LSD0-LSD4) in storage 120. The LSD queue depths are configured such that adding all of them together would equal the size of the queue depth of initiator adapter 127 ("adapter queue depth"). The adapter queue depth represents the total number of I/O requests (SCSI commands) that can be queued at any point in time on initiator adapter 127.

As an example, the adapter queue depth of initiator adapter 127 may be 64, corresponding to 64 I/O requests (SCSI commands) that can be queued at any point in time on initiator adapter 127. In such an example, once there are 64 I/O requests in the adapter queue, any subsequent I/O request received at initiator adapter 127 is rejected. Also, assuming there are, for example, 4 LSD devices in storage 120, storage stack 237 may be configured with 4 LSD queue depths corresponding to the 4 LSDs (e.g., LSD0-LSD3), each with a queue depth size of 16, representing a maximum of active 16 I/O allowed for each LSD. Similar to the adapter queue depth, once there are 16 I/O requests in a LSD queue, any subsequent I/O request destined for the corresponding LSD is rejected by storage stack 237. For example, once all the 4 LSD queues are at capacity (e.g., 16 SCSI commands each), accepting any more SCSI commands on any of the LSD queues would result in having more than 64 SCSI commands at initiator adapter 127, which is not allowed by initiator adapter 127.

A TakeAll-QoS classification tag in a SCSI command, that is destined for a certain LSD (e.g., LSD0), indicates that a higher I/O bandwidth is required by the SCSI command. For example, the SCSI command may be associated with a live migration of a running VM 135 to a different host computer, which is a very resource intensive and time sensitive task. In some embodiments, this is addressed by increasing, at storage stack 237, the LSD queue depth of the LSD that the SCSI command is destined for (e.g., the LSD stores the VM files of VM 135 etc.)

According, if initiator adapter driver 241 determines that the SCSI command's tag indicates a TakeAll-QoS classification, initiator adapter driver 241 proceeds to step 325b in order to indicate to storage stack 237 to make adjustments to the LSD queue depths of one or more of the LSD devices.

However, if initiator adapter driver 241 determines that the SCSI command's tag does not indicate a TakeAll-QoS classification, initiator adapter driver 241 proceeds to step 425e of mapping the QoS classification to, for example, a class-specific control (CS-CTL) QoS value from a number of CS-CTL values and setting or inserting the mapped CS-CTL value into a corresponding CTL field (e.g., CTL field in FC Header 530 as described below in FIG. 5) in the data frame (e.g., data frame 500) that carries the SCSI command to storage 120 over the switch fabric. More specifically, in some embodiments, initiator adapter driver 241 is configured with a mapping (e.g., mapping table, mapping function) to map a QoS classification to a CS-CTL value from a number of CS-CTL values defined by the Fibre channel standards (e.g., T11 Fibre Channel Interfaces standards). For example, where the QoS classification is one of 1, 2, or 3 (e.g., 1 indicating the highest QoS classification), initiator adapter driver 241 may be configured to map such a classification to a corresponding CS-CTL value indicating a high, medium, or low QoS, respectively, and further set the CTL field of the data frame (e.g., data frame 500) based on the mapped CS-CTL value (in one or more bits).

At step 425c, having determined that the SCSI command's tag indicates a TakeAll-QoS classification, initiator adapter driver 241 then determines if this is the only pending SCSI command with a TakeAll-QoS classification being processed at the time. If it is not, then initiator adapter driver 241 proceeds to step 425e without requesting any changes or adjustments to the LSD queue depths.

At step 425d, having determined that the SCSI command is the only pending SCSI command with a TakeAll-QoS classification, in some embodiments, initiator adapter driver 241 then indicates to PSA 240 in storage stack 237 to set the LSD queue depth of all LSDs in storage stack 237 to zero, except for the queue depth of the target LSD (i.e., the LSD that the SCSI command is destined for). Continuing with the example above, the initiator adapter queue depth may be 64 and storage stack 237 may be configured with 4 LSD queue depths (corresponding to LSD0-LSD3) each having size 16. Assuming the target LSD is LSD0, in such an example, initiator adapter driver 241 indicates to PSA 240 in storage stack 237 to set LSD queue depths of LSD1-3 to zero. In some embodiments, initiator adapter driver 241 also increases the target LSD's queue depth of the current SCSI command to the entire adapter queue depth. In the example above, initiator adapter driver 241 increases LSD queue depth of target LSD0 to 64 and the queue depths of LSD1-3 to zero. In such an example, the entire initiator adapter bandwidth (i.e., the entire initiator adapter queue depth of 64) is allocated to the TakeAll-QoS SCSI command. After adjustments to the LSD queue depths are made, initiator adapter driver 241 proceeds to step 425e.

At step 425e, as described above, initiator adapter driver 241 maps the QoS classification of the SCSI command's QoS tag to a CS-CTL value. As described above, in embodiments where the tag indicates a non-TakeAll-QoS classification, initiator adapter driver 241 maps the classification (e.g., high, medium, low, or 1, 2, 3, etc.) to a CS-CTL value (e.g., High_QoS, Medium_QoS, or Low_QoS). If the QoS classification tag indicates a TakeAll-QoS classification, then initiator adapter driver 241 is configured to map the TakeAll-QoS classification to a high priority or high QoS level CS-CTL value (e.g., High_QoS) to ensure that the SCSI command is treated as high priority by the switch fabric (i.e., switches 150). Accordingly, it's important to note that both a SCSI command with a high QoS classification tag as well as a SCSI command with a TakeAll-QoS classification tag are mapped by initiator adapter driver 241 to the same High_QoS CS-CTL value.

Referring back to FIG. 3, at step 330, initiator adapter 127 generates and transmits a data frame (e.g., data frame 500 shown in FIG. 5) including, among other things, the SCSI command (as payload) as well as CS-CTL bits (e.g., in FC header 530) that indicate the CS-CTL value obtained as a result of the mapping in step 425e. For example, initiator adapter driver 241 is configured to use the CS-CTL value to set the CS-CTL bits in the data frame.

Figure 5:
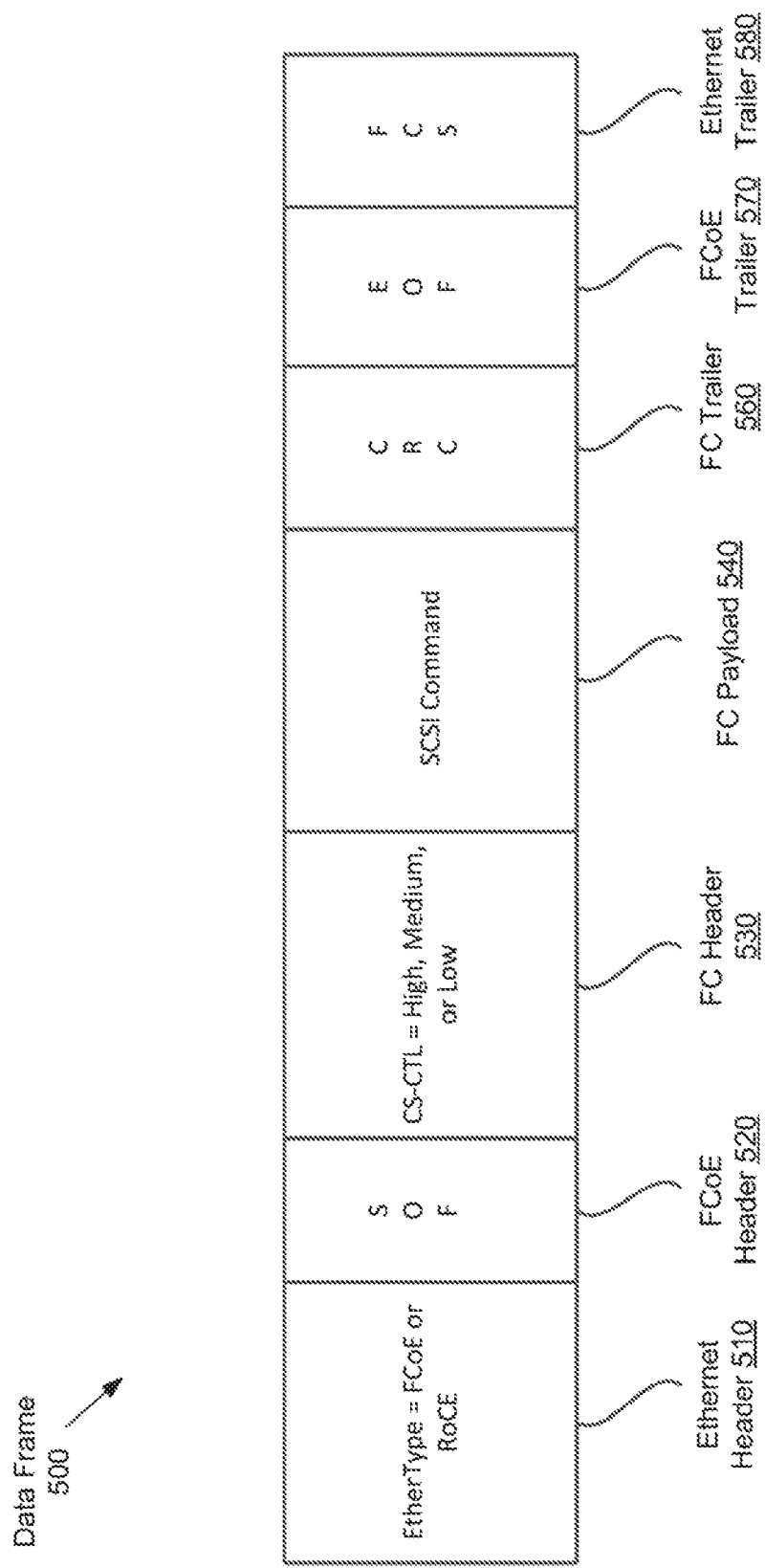
FIG. 5 illustrates an example data frame including a class-specific control value.

FIG. 5 illustrates an example data frame 500 generated by initiator adapter 127. As shown, data frame 500 includes Ethernet header 510, FCoE/RoCE header 520, FC header 530, FC header 530, FC payload 540, FC trailer, FCoE/RCoE trailer 570, and Ethernet trailer 580. As shown, Ethernet header 510 may indicate the type of Ethernet frame that data frame 500 is. In some embodiments, data frame is a FCoE frame, in which case, Ethernet header 510 indicates an FCoE Ethernet frame type. In some embodiments, data frame is a RCoE frame, in which case, Ethernet header 510 indicates an RCoE Ethernet frame type. FCoE header 520 carries FC start of file (SOF) bits. FC header 530 includes a number of fields such as Routing Control, Destination ID, CS-CTL (1 byte), Source ID, Type, Frame Control, Sequence ID, Data Field Control, Sequence Count, Originator Exchange ID, Responder Exchange ID, Parameter, etc. As described above, initiator adapter driver 241 sets the 1 byte of CS-CTL to indicate a CS-CTL value. The 1 byte may indicate a high, medium, low, or no QoS classification. FC payload 540 carries the SCSI command. FC trailer carries cyclic redundancy check bits. FCoE/RCoE trailer 570 carries end of file (EOF) bits. Ethernet trailer 580 carries frame check sequence bits.

As described above, at step 330, initiator adapter 127 transmits data frame 500 to target adapter 186 through the switch fabric.

Referring back to FIG. 3, at step 335, switches 150 receive and forward the data frame using their flow tables configured by QoS controller 112. As described above, end-to-end data paths have been determined and configured by QoS controller 112 based at least on the capabilities of switches 150. As an example, one or more network paths are determined and configured for carrying high QoS SCSI commands over the switch fabric using switches that have higher capabilities than others (e.g., higher bandwidth capacity, higher processing power, etc.). For example, as shown in FIG. 2, QoS controller 112 selected switches $251_1$, $251_4$, and $251_6$ as high capability switches and, therefore, configured flow tables of the switch fabric such that a data frame carrying high QoS SCSI command can be transmitted to storage 120 with, for example, lower latency or quality of service via a network path through switches $251_1$, $251_4$, and $251_6$. The network paths, as described above, are configured by QoS controller 112 through transmitting instructions to switches 150 to program the paths into the switch flow table(s) 152.

In addition, each switch in the switch fabric includes a number of egress ports, each having a number of queues. In some embodiments, each queue is allocated to processing data frames of different QoS classifications. For example, each egress port within a switch may have three queues including a high priority, a medium priority, and a low priority queue. The instructions sent by QoS controller 112 configures the switches' flow tables to prioritize the processing of data frames based on their QoS classifications by using these queues. For example, the flow tables are configured to instruct the switches to place high QoS data frames in their egress ports' high priority queues, place medium priority QoS data frames in egress ports' medium priority queues, and so on.

FIG. 6 illustrates an example flow table 370 that is configured at one or more of switches 150. In some embodiments, flow table 370 includes headers 672, counter 673, and actions 674. However, flow table 370 is merely an example and may be configured with additional or fewer fields etc. In some embodiments, flow table 370 is an OpenFlow flow table.

Headers 672 include one or more headers, each of which is an entry that an incoming data frame may be matched with based on the data frame's type of Ethernet frame (i.e., EtherType), the ingress port of the switch 150 at which the data frame is received, and the data frame's CS-CTL value. Once an incoming data frame is matched with a header, flow table 670 then maps the header to an action that the receiving switch is required to perform on the data frame. Counter 673 provides a counter for the number of data frames that have been matched with a certain header.

As an example, an incoming FCoE data frame received at ingress port 1, of a receiving switch, that has a high QoS CS-CTL value is matched with the first header (from the top) of flow table 670. As the data frame's CS-CTL field indicates that the data frame is a high QoS data frame, the receiving switch places the data frame in a high priority queue of egress port 2. In another example, an incoming FCoE data frame received at ingress port 1 that has a low QoS CS-CTL value is matched with the third header (from the top). As the data frame's CS-CTL field indicates that the data frame is a low priority or level QoS data frame, the receiving switch places the data frame in a low priority queue of egress port 3.

Once the data frame is sent out of the receiving switch's egress port, it is received at another switch 150, whose flow table is also configured by QoS controller 112 to perform similar operations for prioritizing the processing and forwarding of data frames based on their associated QoS classification. As a result, QoS enforcement is observed from one switch to the next, through a data frame's entire path, until the data frame reaches storage 120.

At step 340, target adapter 186 receives the data frame from switches 150. In some embodiments, target adapter 186 and the target adapter driver (not shown) are configured with the same configuration as initiator adapter 127 and initiator adapter driver 241, respectively, as described above. Accordingly, target adapter driver is configured to extract and interpret the CS-CTL value in the CS-CTL field of the received data frame. The target adapter driver then maps the CS-CTL value to a QoS classification value that the storage devices in the array are able to identify. Subsequently, target adapter 186 sends the SCSI command to storage controller 185 of storage array 120 with an indication of the SCSI command's QoS classification.

In some embodiments, storage controller 185 as well as the storage devices in storage array 120 are configured to process received SCSI commands based on the SCSI commands' respective QoS classifications. For example, storage array 120 may allocate storage devices with higher capabilities to handle SCSI commands with high QoS classifications. In another example, storage array 120 prioritizes the processing of SCSI commands with high QoS classifications. In such an example, storage array 120 processes high priority QoS SCSI commands first, the medium priority QoS SCSI commands second, and low priority QoS SCSI commands third.

After processing the SCSI command, at step 345, storage array 120 issues an I/O command response that is transmitted to target adapter 186. The target adapter driver is configured to program the same CS-CTL value, that was used for the incoming data frame, into the outgoing data frame, containing the I/O command response, to ensure that the returning traffic is transmitted with the same QoS. For example, if the CS-CTL field of the incoming data frame, containing the SCSI command, indicated a high QoS, the bits in the CS-CTL field of the outgoing data frame, containing the I/O command responds, are also set by the target adapter driver to indicate a high QoS.

At step 350, target adapter 186 transmits the outgoing data frame, with the CS-CTL value programmed in the frame's CS-CTL field in the FC header, to switches 150.

At step 355, switches 150 forward the data frame back to initiator adapter 127 through configured and appropriate network paths, as described above.

Figure 7:
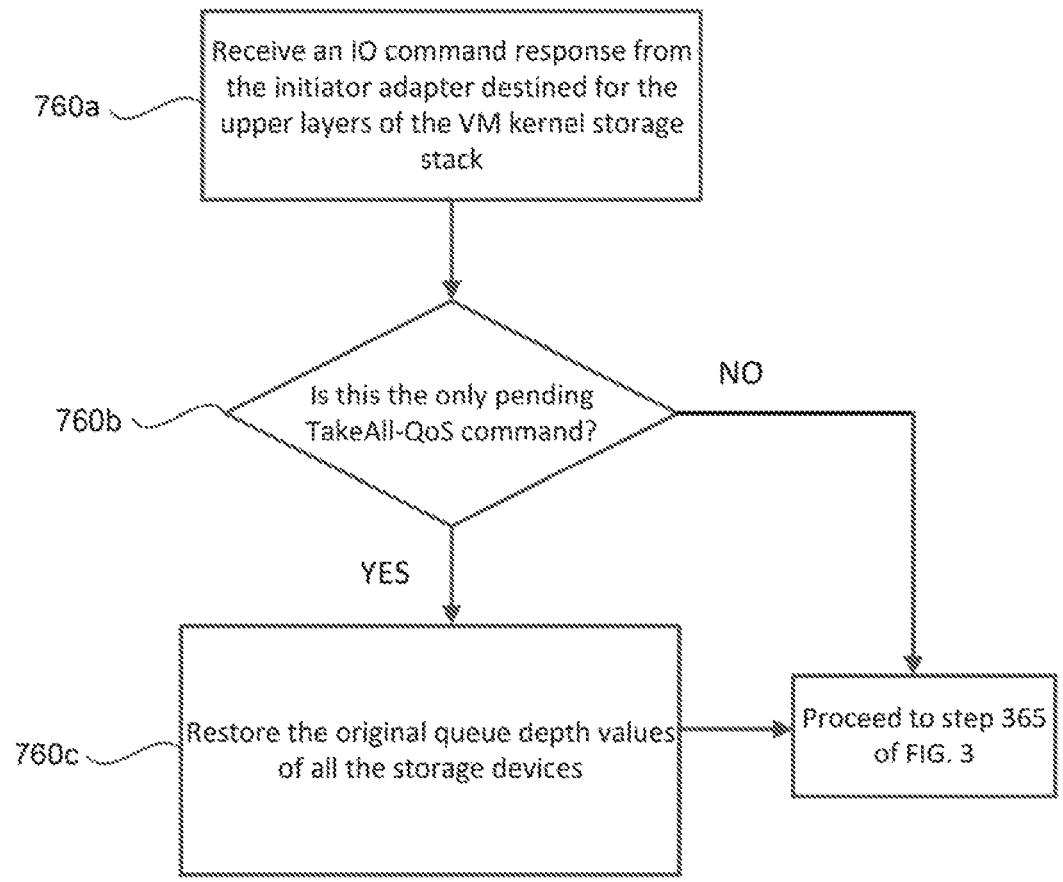
FIG. 7 illustrates example operations for use by an initiator adapter driver when processing an incoming I/O command response.

At step 360, initiator adapter 127 receives the data frame, performs a number of steps shown in FIG. 7, and then transmits the I/O command response of the data frame to storage stack 237. In some embodiments, initiator adapter driver 241 is configured to examine every returning I/O command response received at initiator adapter 127 and perform steps 760*a*-760*c* shown in FIG. 7.

At step 760*a* of FIG. 7, initiator adapter driver 241 receives an I/O command from initiator adapter 127 destined for the upper layers of the storage stack 237.

At step 760*b*, initiator adapter driver 241 determines if this is the only or last pending TakeAll-QoS command (i.e., the last pending TakeAll-QoS command at that point in time).

If yes, at step 760*c*, initiator adapter driver 241 indicates to PSA 240 in storage stack 237 to restore the original queue depth values of all the LSDs. As described above, the queue depth values of all LSDs were adjusted by storage stack 237 in response to an instruction received from initiator adapter driver 241 at step 325 of FIG. 3. Restoring the queue depth values of all LSDs, including the target LSD, allows for traffic to run through all other devices, as was the case prior to the queue depth adjustments at step 425*d* shown in FIG. 4.

As described above, after performing the steps of FIG. 7, initiator adapter driver 241 transmits the I/O response command in the data frame to storage stack 237.

Referring back to FIG. 3, at step 365, storage stack 237 then sends the I/O response command to I/O command source 302.

Accordingly, as shown in FIG. 3, the embodiments described herein enable a policy aware framework for end-to-end application-specific I/O QoS management over a converged network.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

What is claimed is:

1. A method for enforcing application-specific quality of service (QoS) requirements over a storage network, the method comprising:
    receiving, at an initiator network adapter, an input-output (I/O) command to be transmitted to a storage device associated with a target network adapter, the I/O command being received from a virtual machine executing an application, wherein the I/O command corresponds to an I/O request generated by the application and is tagged with a QoS classification corresponding to QoS requirements of the application;
    determining, at the initiator adapter, a QoS value corresponding to the QoS classification of the I/O command, wherein:
        the QoS classification indicates a bandwidth requirement;
        the target network adapter is associated with a plurality of storage devices including the storage device;
        the I/O command is received from the virtual machine through a storage stack configured to process I/O commands received by the application;
        the storage stack is configured with a plurality of queues, corresponding to the plurality of devices, the plurality of queues having a corresponding plurality of queue depths;
    causing, at the initiator network adapter, the plurality of queue depths to be adjusted based on the bandwidth requirement; and
    transmitting, at the initiator network adapter, a data frame including the I/O command and the QoS value to a target network adapter through a switch fabric in a network, the switch fabric having a plurality of switches each configured to forward the data frame based on the QoS value.

2. The method of claim 1, wherein:
    the bandwidth requirement indicates a take-all bandwidth requirement; and
    causing, at the initiator network adapter, the plurality of queue depths to be adjusted further comprises causing a queue depth of a queue corresponding to the storage device to be set to a queue depth of the initiator adapter and further causing queue depths of the plurality of queue depths to be set to zero.

3. The method of claim 2, further comprising:
    receiving, at the initiator network adapter, an I/O command response corresponding to the I/O command from the target adapter through the switch fabric of the network, the switch fabric being configured to forward the I/O command response based on the QoS value;
    determining, at the initiator network adapter, that the QoS classification indicates the take-all bandwidth requirement; determining, at the initiator network adapter, whether the I/O command response is a last pending I/O command response with the take-all bandwidth requirement
    causing, at the initiator network adapter, the plurality of queue depths to be readjusted upon determining that the I/O command response is the last pending I/O command response; and
    transmitting, at the initiator network adapter, the I/O command response to the storage stack.

4. The method of claim 2, wherein the determined QoS value indicates a high QoS value.

5. The method of claim 1, further comprising:
    determining, at the initiator network adapter, whether there is any other pending I/O command with the take-all bandwidth requirement, wherein causing the plurality of queue depths to be adjusted further comprises causing a queue depth of a queue corresponding to the storage device to be adjusted upon determining there is no other pending I/O command with the take-all bandwidth requirement.

6. The method of claim 1, wherein the plurality of switches comprise forwarding tables configured by a QoS controller based on capabilities of the corresponding plurality of switches.

7. The method of claim 1, wherein the QoS value comprises a class-specific control (CS-CTL) QoS value.

8. The method of claim 1, wherein the network comprises a Fibre Channel over Ethernet network.

9. A non-transitory computer readable medium comprising instructions to be executed in a computer system, wherein the instructions when executed in the computer system perform a method for enforcing application-specific quality of service (QoS) requirements over a storage network, the method comprising:
    receiving, at an initiator network adapter, an input-output (I/O) command to be transmitted to a storage device associated with a target network adapter, the I/O command being received from a virtual machine executing an application, wherein the I/O command corresponds to an I/O request generated by the application and is tagged with a QoS classification corresponding to QoS requirements of the application;
    determining, at the initiator adapter, a QoS value corresponding to the QoS classification of the I/O command, wherein:

the QoS classification indicates a bandwidth requirement;
the target network adapter is associated with a plurality of storage devices including the storage device;
the I/O command is received from the virtual machine through a storage stack configured to process I/O commands received by the application;
the storage stack is configured with a plurality of queues, corresponding to the plurality of devices, the plurality of queues having a corresponding plurality of queue depths;
causing, at the initiator network adapter, the plurality of queue depths to be adjusted based on the bandwidth requirement; and
transmitting, at the initiator network adapter, a data frame including the I/O command and the QoS value to a target network adapter through a switch fabric in a network, the switch fabric having a plurality of switches each configured to forward the data frame based on the QoS value.

10. The non-transitory computer readable medium of claim 9, wherein:
the bandwidth requirement indicates a take-all bandwidth requirement;
causing, at the initiator network adapter, the plurality of queue depths to be adjusted further comprises causing a queue depth of a queue corresponding to the storage device to be set to a queue depth of the initiator adapter and further causing queue depths of the plurality of queue depths to be set to zero.

11. The non-transitory computer readable medium of claim 10, further comprising:
receiving, at the initiator network adapter, an I/O command response corresponding to the I/O command from the target adapter through the switch fabric of the network, the switch fabric being configured to forward the I/O command response based on the QoS value;
determining, at the initiator network adapter, that the QoS classification indicates the take-all bandwidth requirement;
determining, at the initiator network adapter, whether the I/O command response is a last pending I/O command response with the take-all bandwidth requirement; and
causing, at the initiator network adapter, the plurality of queue depths to be readjusted upon determining that the I/O command response is the last pending I/O command response; and
transmitting, at the initiator network adapter, the I/O command response to the storage stack.

12. A computer system comprising:
an initiator network adapter;
a non-transitory memory comprising executable instructions; and
a processor in data communication with the memory and configured to execute the instructions to cause the apparatus to perform a method comprising:
receiving, at the initiator network adapter, an input-output (I/O) command to be transmitted to a storage device associated with a target network adapter, the I/O command being received from a virtual machine executing an application, wherein the I/O command corresponds to an I/O request generated by the application and is tagged with a QoS classification corresponding to QoS requirements of the application;
determining, at the initiator adapter, a QoS value corresponding to the QoS classification of the I/O command, wherein:
the QoS classification indicates a bandwidth requirement;
the target network adapter is associated with a plurality of storage devices including the storage device;
the I/O command is received from the virtual machine through a storage stack configured to process I/O commands received by the application;
the storage stack is configured with a plurality of queues, corresponding to the plurality of devices, the plurality of queues having a corresponding plurality of queue depths;
causing, at the initiator network adapter, the plurality of queue depths to be adjusted based on the bandwidth requirement; and
transmitting, at the initiator network adapter, a data frame including the I/O command and the QoS value to a target network adapter through a switch fabric in a network, the switch fabric having a plurality of switches each configured to forward the data frame based on the QoS value.

13. The computer system of claim 12, wherein: the bandwidth requirement indicates a take-all bandwidth requirement;
causing, at the initiator network adapter, the plurality of queue depths to be adjusted further comprises causing a queue depth of a queue corresponding to the storage device to be set to a queue depth of the initiator adapter and further causing queue depths of the plurality of queue depths to be set to zero.

14. The computer system of claim 13, further comprising:
receiving, at the initiator network adapter, an I/O command response corresponding to the I/O command from the target adapter through the switch fabric of the network, the switch fabric being configured to forward the I/O command response based on the QoS value;
determining, at the initiator network adapter, that the QoS classification indicates the take-all bandwidth requirement;
determining, at the initiator network adapter, whether the I/O command response is a last pending I/O command response with the take-all bandwidth requirement
causing, at the initiator network adapter, the plurality of queue depths to be readjusted upon determining that the I/O command response is the last pending I/O command response; and
transmitting, at the initiator network adapter, the I/O command response to the storage stack.

* * * * *